J. W. REYNOLDS.
ARTIFICIAL FISHING BAIT.
APPLICATION FILED AUG. 31, 1918.
1,320,570.
Patented Nov. 4, 1919.
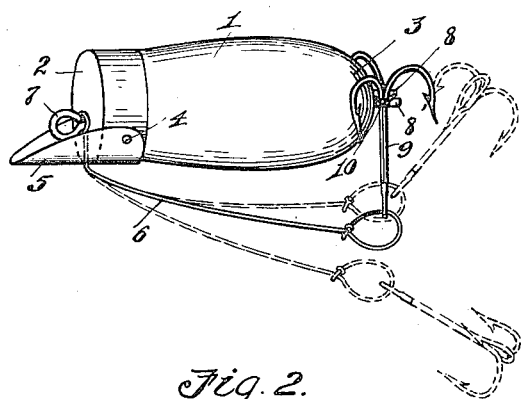
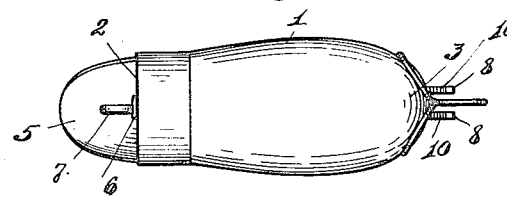
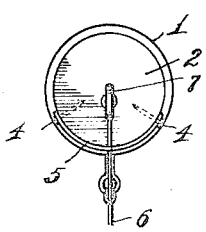
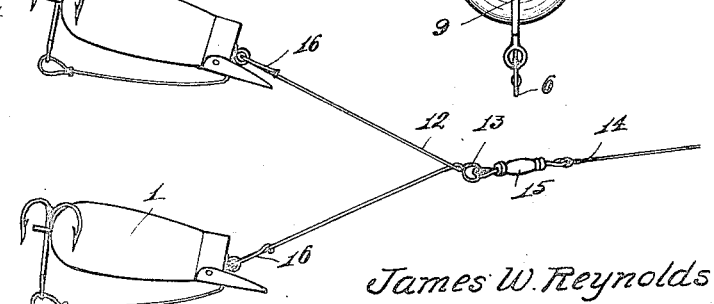
James W. Reynolds
INVENTOR
By George J. Itsch
ATTORNEY.

UNITED STATES PATENT OFFICE.

JAMES W. REYNOLDS, OF CHICAGO, ILLINOIS.

ARTIFICIAL FISHING-BAIT.

1,320,570.  Specification of Letters Patent.  Patented Nov. 4, 1919.

Application filed August 31, 1918. Serial No. 252,202.

*To all whom it may concern:*

Be it known that I, JAMES W. REYNOLDS, a citizen of the United States, residing at Chicago, in the county of Cook and State of Illinois, have invented certain new and useful Improvements in Artificial Fishing-Baits, of which the following is a specification.

The invention relates to improvements in artificial baits or lures for fishing purposes, and its primary object resides in the provision of a bait or lure, the hooks of which may be so disposed with relation to the body, so that the latter will afford protection against the hooks gathering weeds and the like when used for trolling or casting in relatively shallow water. A further object resides in providing the bait with a hook adapted to be normally carried in an inoperative position, and which, upon being struck by a fish, permits the hook to assume an operative position.

A further object is to provide a bait that will float when not in action, but when drawn through the water will dive a short distance beneath the surface, and will have an erratic or irregular movement somewhat resembling the action of a small fish.

A still further object is to provide means for connecting two baits together so that they will travel through the water in pairs and sidewise spaced relation, and by the relatively irregular movements thereof cause more agitation of the water, and thus more attractive for game fish.

With the foregoing and other objects in view, the invention in the preferred form of details will be described in the following specification, reference being had particularly to the accompanying drawings, in which:—

Figure 1 is a side elevation of the improved bait.

Fig. 2 is a plan view thereof.

Fig. 3 is a front end view thereof.

Fig. 4 is a rear end view thereof.

Fig. 5 is a side elevation showing a pair of baits connected for travel in sidewise spaced relation.

The bait body 1, which may be made of any suitable buoyant material, such as wood, is preferably of circular cross-section throughout the major part of its length, and is provided with a blunt or flat forward end 2, and a rounded rear end 3. Attached to the forward end of the body, as by means of brads 4, is what I term a beak 5, which consists of a curved metal plate rounded edgewise forwardly of the body. As the blunt forward end of the body as it travels through the water will tend to displace water in all directions, such displacement will be resisted in part by the beak 5, thus tilting the bait and causing same to dive and travel beneath the surface, the depth of travel depending upon the speed with which the same is drawn through the water.

Attached to the forward end of the body is a spring wire leader 6, which passes through an opening (not shown) in the beak 5, and is looped around the shank of a screw-eye 7, which latter serves as a means for attaching the line to the bait. The screw-eye thus serves as a line attaching means and as a means as well for attaching or fixing the leader 6 to the body, as plainly shown in Fig. 1. The leader 6 extends rearwardly of the front end of and beneath the body, and is of approximately the same length as the body. The leader 6 being of spring wire is free to flex and to be consequently brought under tension, its free end being provided preferably with a treble hook, as shown. Extending from the body 1 and rearwardly thereof are spaced pins 8, between which the shank of the hook, as 9, is adapted to be positioned with the points thereof directed downwardly, the tension of the leader when the hook is thus placed serving to frictionally hold the hook from displacement by sliding off the ends of the pins, which displacement occurs immediately the tension is lessened. The hook thus being placed with relation to the body, the latter serves as a protection for the hook to prevent the points thereof snagging weeds and the like as the bait is drawn through the water, while the leader, due to its location and form, will permit the bait to ride over any obstruction or vegetable growth in the water, thus providing a highly practical weedless casting and trolling bait. In striking the bait the impact of the fish with the leader releases the tension thereof and permits the hook to drop from inoperative to operative position, as plainly shown by full and dotted lines in Fig. 1. In some cases, I prefer to provide the pins 8 with threads or notches 10, so that the hook will not so easily slide off the ends thereof, as might occur if the bait be given a sudden jerk in casting.

One of the advantageous ways of using my improved bait is shown in Fig. 5, which consists in the employment of two baits connected together by a V-shaped leader 12, preferably of relatively stiff wire, which is twisted to form an eye 13 for the attachment of the line 14, as by means of a swivel 15, and the ends of which are formed with snaps 16 for connection with the line attaching eye of each bait. For such use baits of a relatively small size are used, so as to be adapted for casting, trolling or use in connection with a fly rod. As such twin baits each have their own peculiar wagging action and travel in sidewise relation through the water, they form a highly attractive lure for game fish, and one which can be as easily and skilfully handled as the ordinary single bait.

While the foregoing is the preferred form of my invention, I desire it to be understood that I do not limit myself to the precise structure shown and described, as it is obvious that the same may be variously modified without departing from the spirit of the invention.

What is claimed is:—

1. An artificial bait including a body, a hook, a flexible leader fixed at one end to the body and its free end swingingly carrying the hook, and pins projecting from the rear end of the body, said hook being adapted to enter between and engage said pins and frictionally held thereon in inverted position by bringing the leader under tension.

2. An artificial bait including a body, a flexible leader secured at one end to the forward end thereof, a hook swingingly carried by the free end of the leader, and spaced pins projecting rearwardly of the body adapted to receive the shank of the hook therebetween in inverted position and with the flexible leader under tension, and the contact of the hook with said pins opposing said tension.

In testimony whereof I affix my signature.

JAMES W. REYNOLDS.